(12) United States Patent
Watanabe

(10) Patent No.: US 10,967,735 B2
(45) Date of Patent: Apr. 6, 2021

(54) CONTROL DEVICE FOR FOUR-WHEEL DRIVE VEHICLE

(71) Applicant: TOYOTA JIDOSHA KABUSHIKI KAISHA, Toyota (JP)

(72) Inventor: Ryochi Watanabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 16/135,219

(22) Filed: Sep. 19, 2018

(65) Prior Publication Data

US 2019/0084416 A1    Mar. 21, 2019

(30) Foreign Application Priority Data

Sep. 21, 2017    (JP) .............................. JP2017-181174

(51) Int. Cl.
| | |
|---|---|
| *B60K 17/346* | (2006.01) |
| *B60K 23/04* | (2006.01) |
| *B60K 23/08* | (2006.01) |
| *F16D 27/00* | (2006.01) |
| *F16D 28/00* | (2006.01) |
| *F16H 48/22* | (2006.01) |

(52) U.S. Cl.
CPC .......... *B60K 17/3462* (2013.01); *B60K 23/04* (2013.01); *B60K 23/0808* (2013.01); *F16D 27/004* (2013.01); *F16D 28/00* (2013.01); *B60K 2023/043* (2013.01); *B60K 2023/085* (2013.01); *B60K 2023/0833* (2013.01); *F16H 48/22* (2013.01)

(58) Field of Classification Search
CPC ................ B60K 17/3462; B60K 23/04; B60K 23/0808; B60K 2023/0816; B60K 2023/0833; B60K 2023/085
See application file for complete search history.

(56) References Cited

U.S. PATENT DOCUMENTS 4,986,388 A * 1/1991 Matsuda ............ B60K 23/0808
                                                        180/233
5,065,836 A * 11/1991 Hamada ................... B62D 9/00
                                                        180/245

(Continued)

FOREIGN PATENT DOCUMENTS

| JP | 2002-127881 A | 5/2002 |
|---|---|---|
| JP | 2007-45194 A | 2/2007 |

*Primary Examiner* — Tony H Winner
(74) *Attorney, Agent, or Firm* — Sughrue Mion, PLLC

(57) ABSTRACT

A control device is to be applied to a four-wheel drive vehicle including a first coupling device interposed between a rear-wheel final gear device and a rear left wheel axle and a second coupling device interposed between the rear-wheel final gear device and a rear right wheel axle. The control device includes a controller changes a coupling torque of the first coupling device and a coupling torque of the second coupling device independently of each other. The controller estimates, when the vehicle is accelerating, a vehicle body speed of the vehicle under a state in which the coupling torque of any one of the first coupling device and the second coupling device is set to a value larger than zero and the coupling torque of another one thereof is set to zero. Thereby, the control device can accurately estimate the vehicle body speed when the vehicle is traveling while accelerating.

3 Claims, 5 Drawing Sheets

(56) References Cited

U.S. PATENT DOCUMENTS

| | | | |
|---|---|---|---|
| 5,253,728 A * | 10/1993 | Matsuno | B60K 23/04 |
| | | | 180/197 |
| 9,376,014 B2 * | 6/2016 | Maeda | B62D 11/003 |
| 10,059,201 B2 * | 8/2018 | Ekonen | B60K 17/346 |
| 10,746,757 B2 * | 8/2020 | Watanabe | G01P 21/00 |
| 2007/0029127 A1 | 2/2007 | Mori et al. | |
| 2019/0293172 A1 * | 9/2019 | Shinohara | B60K 17/344 |

* cited by examiner

CONTROL DEVICE FOR FOUR-WHEEL DRIVE VEHICLE

BACKGROUND

1. Technical Field

The present invention relates to a control device for a four-wheel drive vehicle, which is to be applied to a four-wheel drive vehicle including a front-wheel differential device configured to transmit a driving force generated by a drive device to front right and left wheels, and a rear-wheel final gear device configured to transmit the driving force to rear right and left wheels via coupling devices.

2. Description of the Related Art

A hitherto-known control device for a four-wheel drive vehicle (hereinafter also referred to simply as "vehicle") acquires wheel speeds of a front left wheel, a front right wheel, a rear left wheel, and a rear right wheel of the vehicle based on signals from wheel speed sensors provided to the respective wheels, and uses the acquired wheel speeds to estimate a vehicle body speed. Further, such a control device performs vehicle control (e.g., traction control) based on the estimated vehicle body speed.

Such a control device uses the lowest value among the acquired wheel speeds as the vehicle body speed when the vehicle accelerates. However, in a case where all the four wheels (front left wheel, front right wheel, rear left wheel, and rear right wheel) are slipping when the vehicle accelerates, the wheel speeds of all the four wheels have values that are excessively higher than a true vehicle body speed, and hence the estimated vehicle body speed is excessively higher than the true vehicle body speed.

In view of this, when a vehicle accelerates, one of the related-art control device selects a wheel speed of a wheel that is applied with the lowest driving torque or that has the lowest wheel speed among the four wheels, and calculates road surface friction coefficients between the respective four wheels and a road surface. Further, the control device selects the lowest or second lowest road surface friction coefficient among the calculated road surface friction coefficients, and calculates an acceleration upper limit value based on the selected road surface friction coefficient.

The control device then uses the calculated acceleration upper limit value to limit the selected wheel speed, to thereby calculate an estimated vehicle body speed (for example, refer to Japanese Patent Application Laid-open (kokai) No. 2002-127881, see FIG. 3).

A road surface friction coefficient is calculated based on, for example, a driving torque of a wheel, inertia of the wheel, a load on the wheel, and an angular acceleration of the wheel, but it is not easy to accurately estimate all those values, and it is consequently not easy to calculate an accurate road surface friction coefficient. Further, even when the calculated road surface friction coefficient is an accurate value, it is not easy to calculate an accurate acceleration upper limit value based on the road surface friction coefficient. Accordingly, in some cases, the estimated vehicle body speed may deviate greatly from a true vehicle body speed, and as a result, a situation in which vehicle control that uses the estimated vehicle body speed cannot be appropriately performed may occur.

SUMMARY

The present invention is made to solve the problem mentioned above. Specifically, it is an object of the present invention to provide a control device for a four-wheel drive vehicle capable of more accurately estimating a vehicle body speed of the four-wheel drive vehicle while the vehicle is accelerating.

In view of the above, a control device for a four-wheel drive vehicle according to the present invention (hereinafter also referred to as "present invention device") is to be applied to a four-wheel drive vehicle (10) including a drive device (20), a front-wheel differential device (31), a transfer gear device (33), a rear-wheel final gear device (35), a first coupling device (361), and a second coupling device (362). The drive device generates a driving force. The front-wheel differential device transmits the driving force to a front left wheel axle (32L) and a front right wheel axle (32R) and allows a differential between the front left wheel axle and the front right wheel axle. The transfer gear device transmits the driving force to a rear wheel side via a propeller shaft (34). The rear-wheel final gear device transmits the driving force from the propeller shaft to a rear left wheel axle (38L) and a rear right wheel axle (38R). The first coupling device is interposed between a drive output device (353) of the rear-wheel final gear device and the rear left wheel axle. The second coupling device is interposed between the drive output device and the rear right wheel axle.

Further, the present invention device includes: wheel speed sensors (82) each configured to generate a signal based on a rotation speed of a corresponding one of wheels coupled to the front left wheel axle, the front right wheel axle, the rear left wheel axle, and the rear right wheel axle, respectively; a wheel speed calculator (60) configured to calculate a wheel speed of each of the wheels based on the signals generated by the wheel speed sensors; an estimated vehicle body speed calculator (60) configured to estimate a vehicle body speed of the four-wheel drive vehicle based on a specific wheel speed among the calculated wheel speeds; and a controller (60) configured to change a coupling torque (Tc1) of the first coupling device and a coupling torque (Tc2) of the second coupling device independently of each other.

The first coupling device and the second coupling device are each constructed of, for example, any one of a multi-plate clutch, an electromagnetic clutch, and a clutch obtained by combining a multi-plate clutch and an electromagnetic clutch. A transmission torque of the above-mentioned clutch is referred to as "coupling torque".

Incidentally, when the four-wheel drive vehicle accelerates in a four-wheel drive state, the driving force is transmitted to all the wheels (four wheels) of the front left wheel, the front right wheel, the rear left wheel, and the rear right wheel, and hence, for example, when a road surface is a low-μ road, all the wheels sometimes fall into an acceleration slip state. In this case, whichever wheel is used for the wheel speed, it is difficult to accurately estimate the vehicle body speed.

Therefore, in the present invention device, the controller is configured to execute, when the four-wheel drive vehicle is accelerating, specific control of setting the coupling torque of any one of the first coupling device and the second coupling device to a value larger than zero and setting the coupling torque of another one of the first coupling device and the second coupling device to zero (Step 305 to Step 345), and the estimated vehicle body speed calculator is configured to use, as the specific wheel speed, the wheel speed of one of the wheels that corresponds to one of the first coupling device and the second coupling device that has the coupling torque set to zero (Step 350 to Step 365).

According to the present invention device, the driving force is transmitted to the front left wheel and the front right wheel via the front-wheel differential device. Accordingly, both of the front left wheel and the front right wheel serve as drive wheels. Further, when the vehicle is accelerating, the coupling torque of any one of the first coupling device and the second coupling device is set to a value larger than zero, and the coupling torque of another one thereof is set to zero. Therefore, the driving force is not transmitted to a rear wheel that is coupled to one of the first coupling device and the second coupling device that has the coupling torque set to zero, and hence this rear wheel serves as a free wheel (driven wheel). Meanwhile, the driving force is transmitted to a rear wheel that is coupled to one of the first coupling device and the second coupling device that has the coupling torque set to a value larger than zero, and hence this rear wheel serves as a drive wheel.

Thus, the rear wheel (free wheel) that is coupled to one of the first coupling device and the second coupling device that has the coupling torque set to zero does not fall into an acceleration slip state, and hence the wheel speed of this rear wheel is the lowest among the wheel speeds of all the wheels (four wheels) and is a value representing a true vehicle body speed with high accuracy. In view of this, the estimated vehicle body speed calculator uses the wheel speed of the rear wheel serving as the free wheel as the specific wheel speed to be used for the estimation of the vehicle body speed. As a result, the present invention device can estimate the vehicle body speed with high accuracy. In addition, the rear wheel that is coupled to one of the first coupling device and the second coupling device that has the coupling torque set to a value larger than zero serves as the drive wheel, and hence it is also possible to prevent the driving force of the entire four-wheel drive vehicle from greatly decreasing.

In a control device for a four-wheel drive vehicle according to one aspect of the present invention, the controller may be configured to repeatedly perform, as the specific control, first control of maintaining a first state, in which the coupling torque of the first coupling device is set to a value larger than zero and the coupling torque of the second coupling device is set to zero, for a first predetermined period (Tp1), and subsequently maintaining a second state, in which the coupling torque of the first coupling device is set to zero and the coupling torque of the second coupling device is set to a value larger than zero, for a second predetermined period (Tp2).

In this aspect, the first state, in which the rear left wheel serves as the drive wheel and the rear right wheel serves as the free wheel, is maintained for the first predetermined period, and subsequently, the second state, in which the rear left wheel serves as the free wheel and the rear right wheel serves as the drive wheel, is maintained for the second predetermined period. Those states are then repeated. Therefore, according to this aspect, the driving torque is alternately applied to the rear left wheel and the rear right wheel while the vehicle is traveling. As a result, even under a state in which only one of the rear wheels is driven, it is possible to enhance stability of the vehicle while the vehicle is traveling straight.

In a control device for a four-wheel drive vehicle according to one aspect of the present invention, the controller is configured to repeatedly perform, as the specific control, second control of maintaining a first state, in which the coupling torque of the first coupling device is set to a value larger than zero and the coupling torque of the second coupling device is set to zero, for a period in which the four-wheel drive vehicle travels for a first distance (Dp1), and subsequently maintaining a second state, in which the coupling torque of the first coupling device is set to zero and the coupling torque of the second coupling device is set to a value larger than zero, for a period in which the four-wheel drive vehicle travels for a second distance (Dp2).

In this aspect, the first state, in which the rear left wheel serves as the drive wheel and the rear right wheel serves as the free wheel, is maintained for the period in which the vehicle travels for the first distance, and subsequently, the second state, in which the rear left wheel serves as the free wheel and the rear right wheel serves as the drive wheel, is maintained for the period in which the vehicle travels for the second distance. Those states are then repeated. Therefore, according to this aspect, the driving torque is alternately applied to the rear left wheel and the rear right wheel while the vehicle is traveling. As a result, even under a state in which only one of the rear wheels is driven, it is possible to enhance stability of the vehicle while the vehicle is traveling straight.

According to one or more embodiments of the present invention, the controller is configured to execute the specific control when the vehicle is traveling straight, and is configured to be inhibited from executing the specific control when the vehicle is not traveling straight. Further, according to one or more embodiments of the present invention, the controller is configured to execute the specific control when the vehicle is traveling on a low-μ road, which has a road surface friction coefficient smaller than a predetermined value, and is configured to be inhibited from executing the specific control when the vehicle is not traveling on a low-μ road. Moreover, according to one or more embodiments of the present invention, the controller is configured to execute the specific control when a driver selects as a travel mode a first mode, which is a travel mode in which traveling stability is prioritized over traveling performance, and is configured to be inhibited from executing the specific control when the driver selects as the travel mode a second mode, which is a travel mode in which the traveling performance is prioritized over the traveling stability.

In the descriptions given above, in order to facilitate understanding of the present invention, names and/or reference symbols used in embodiments of the present invention described below are enclosed in parentheses, and are assigned to elements of the invention corresponding to the embodiments. However, the respective elements of the present invention are not limited to the embodiments defined by the names and/or the reference symbols. Other objects, other features, and accompanying advantages of the present invention are readily understood from a description of the embodiments of the present invention to be given referring to the following drawings.

DETAILED DESCRIPTION

First Embodiment (Configuration)

Figure 1:
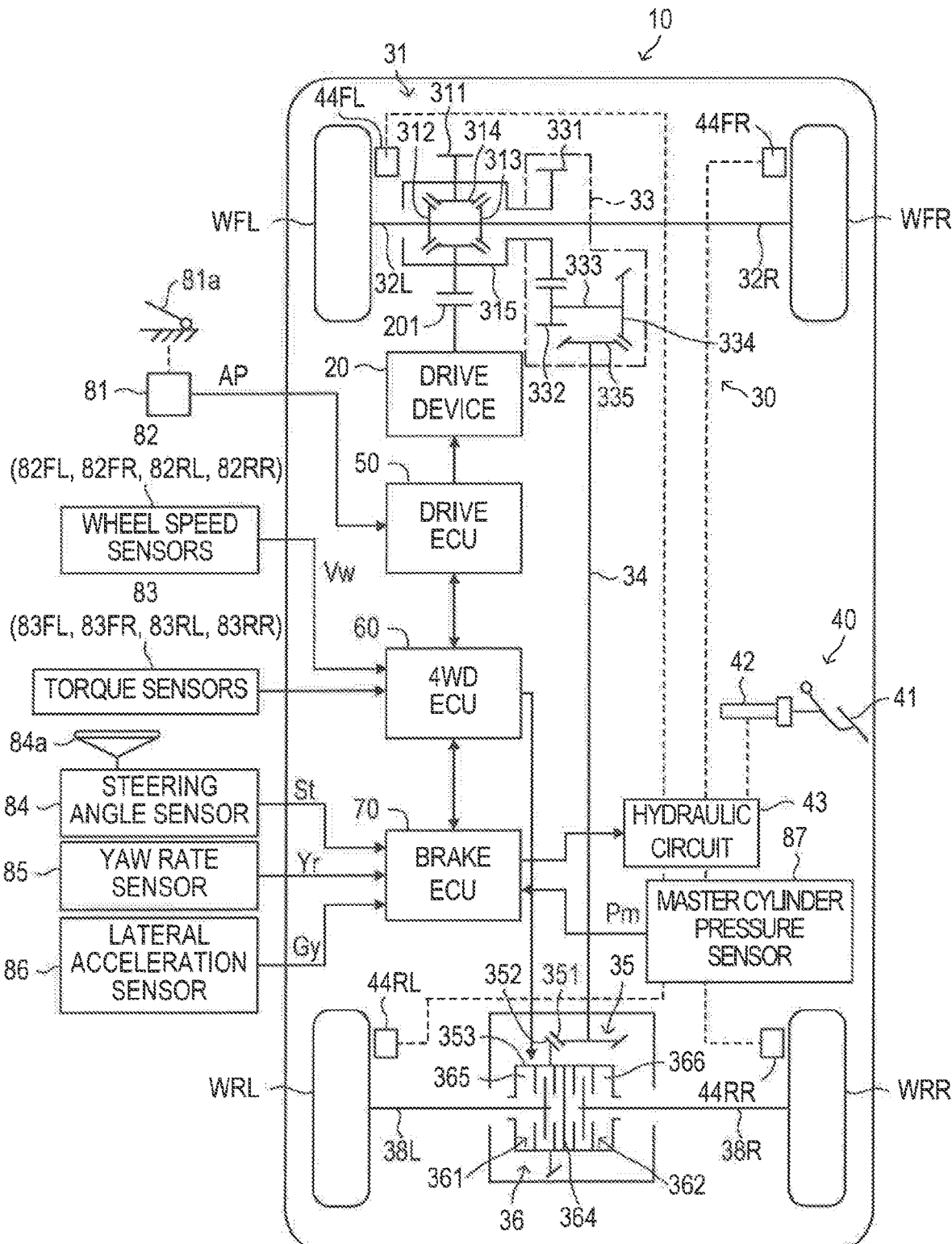
FIG. 1 is a schematic configuration diagram for illustrating a control device for a four-wheel drive vehicle according to according to a first embodiment of the present invention.

As illustrated in FIG. 1, a control device for a four-wheel drive vehicle according to a first embodiment of the present invention (hereinafter also referred to as "first device") is applied to a four-wheel drive vehicle 10.

The vehicle 10 includes a drive device 20, a driving force transmission device 30, a braking device 40, a drive ECU 50, a 4WD ECU 60, a brake ECU 70, and other components. The drive ECU 50, the 4WD ECU 60, and the brake ECU 70 correspond to a control device according to one embodiment of the present invention. Two or more ECUs among those ECUs may be integrated into one ECU.

The ECU is an abbreviated word for an electronic control unit, and is an electronic control circuit including as its main component a microcomputer including a CPU, a ROM, a RAM, a backup RAM (or nonvolatile memory) and an interface I/F, and the like. The CPU is configured to execute instructions (routines) stored in the ROM to thereby implement various functions described later.

The drive device 20 generates a driving force. The drive device 20 drives wheels of the vehicle 10 (front left wheel WFL, front right wheel WFR, rear left wheel WRL, and rear right wheel WRR) via the driving force transmission device 30. The drive device 20 is constructed of a combination of an internal combustion engine and a transmission of a general vehicle. The drive device 20 may be any drive device for a vehicle that is known in the art, such as a combination of an electric motor and a transmission, and a combination of an internal combustion engine, an electric motor, and a transmission.

The driving force transmission device 30 includes a front-wheel differential device 31, a front left wheel axle 32L, a front right wheel axle 32R, a transfer gear device 33, a propeller shaft 34, a rear-wheel final gear device 35, a clutch device 36, a rear left wheel axle 38L, a rear right wheel axle 38R, and other components.

The front-wheel differential device 31 includes a drive gear 311, a left side gear 312, a right side gear 313, a pinion gear 314, and a front differential case 315. The drive gear 311 meshes with a transmission output gear 201 configured to output a driving force generated by the drive device 20. The left side gear 312 is directly coupled to the front left wheel axle 32L, and rotates integrally with the front left wheel axle 32L. The right side gear 313 is directly coupled to the front right wheel axle 32R, and rotates integrally with the front right wheel axle 32R. The pinion gear 314 couples the left side gear 312 and the right side gear 313 to each other. The front differential case 315 is directly coupled to the drive gear 311 and rotates integrally with the drive gear 311, and accommodates the left side gear 312, the right side gear 313, and the pinion gear 314. With this configuration, the front-wheel differential device 31 distributes the driving force generated by the drive device 20 to the front left wheel axle 32L and the front right wheel axle 32R while allowing a differential therebetween.

The transfer gear device 33 includes an input gear 331, a counter gear 332, a counter shaft 333, a first ring gear 334, and a first pinion gear 335. The input gear 331 is directly coupled to the front differential case 315, and rotates integrally with the front differential case 315. The counter gear 332 meshes with the input gear 331. The counter shaft 333 has one end provided with and fixed to the counter gear 332 and another end provided with and fixed to the first ring gear 334. Accordingly, the first ring gear 334 rotates integrally with the counter gear 332. The first pinion gear 335 meshes with the first ring gear 334, and is provided to be fixed to a front end portion of the propeller shaft 34, and rotates integrally with the propeller shaft 34. The first pinion gear 335 and the first ring gear 334 constitute a so-called hypoid gear, in which the first pinion gear 335 and the first ring gear 334 mesh with each other with the center of an axis of the first pinion gear 335 being offset from a rotational center of the first ring gear 334.

The rear-wheel final gear device 35 includes a second pinion gear 351, a second ring gear 352, and a rear differential case 353. The second pinion gear 351 is provided to be fixed to a rear end portion of the propeller shaft 34, and rotates integrally with the propeller shaft 34. The second ring gear 352 meshes with the second pinion gear 351. The rear differential case 353 is a cylindrical case, which is provided coaxially with the rear left wheel axle 38L and the rear right wheel axle 38R, and is directly coupled to the second ring gear 352. Accordingly, the rear differential case 353 is configured to rotate around the rear left wheel axle 38L and the rear right wheel axle 38R integrally with the second ring gear 352. The second pinion gear 351 and the second ring gear 352 constitute a hypoid gear. The rear differential case 353 is also referred to as "drive output device".

The clutch device 36 includes a first clutch 361 and a second clutch 362. The first clutch 361 transmits or interrupts the driving force between the rear-wheel final gear device 35 and the rear left wheel axle 38L. The second clutch 362 transmits or interrupts the driving force between the rear-wheel final gear device 35 and the rear right wheel axle 38R. The first clutch 361 and the second clutch 362 are each an independent variable control-type clutch capable of independently changing a transmission torque in accordance with a command from the 4WD ECU 60. The first clutch 361 and the second clutch 362 are also referred to as "first coupling device 361" and "second coupling device 362", respectively. A partition wall 364 is provided in the middle of the rear differential case 353 in its axial direction (lateral direction of the vehicle). A first clutch chamber 365 is formed on a vehicle's left side of the partition wall 364, and a second clutch chamber 366 is formed on a vehicle's right side of the partition wall 364. The first clutch 361 and the second clutch 362 are accommodated in the first clutch chamber 365 and the second clutch chamber 366, respectively. This configuration of the clutch device 36 is known, and is incorporated herein by referring to Japanese Patent Application Laid-open (kokai) No. 2007-45194. The first clutch 361 and the second clutch 362 are each a clutch obtained by combining a multi-plate clutch and an electromagnetic clutch.

The braking device 40 includes a brake pedal 41, a master cylinder 42, a hydraulic circuit 43, wheel cylinders 44 (44FL, 44FR, 44RL, and 44RR), and the like.

The braking force to be applied to each of the front left wheel WFL, the front right wheel WFR, the rear left wheel WRL, and the rear right wheel WRR are controlled by the hydraulic circuit 43 of the braking device 40 controlling a braking pressure of the corresponding wheel cylinders 44FL, 44FR, 44RL, and 44RR. The hydraulic circuit 43 includes a reservoir, oil pumps, and other various valve devices (not shown), and functions as a brake actuator.

The drive ECU 50 is connected to the 4WD ECU 60 and the brake ECU 70 through controller area network (CAN) communication in a manner that allows those ECUs to exchange information. The drive ECU 50 is electrically connected to various sensors including an accelerator opening degree sensor 81, and is configured to receive output signals from those sensors. The accelerator opening degree sensor 81 is configured to generate an output signal indicating a depression amount (hereinafter also referred to as "accelerator opening degree") AP of an accelerator pedal 81a, which is provided so as to be operable by the driver. The drive ECU 50 is electrically connected to the drive device 20. The drive ECU 50 is configured to transmit various signals for controlling the drive device 20 based on the depression amount AP of the accelerator pedal 81a and an operation of a shift lever (not shown).

The 4WD ECU 60 is electrically connected to wheel speed sensors 82 (82FL, 82FR, 82RL, and 82RR), torque sensors 83 (83FL, 83FR, 83RL, and 83RR), and others, and is configured to receive output signals from those sensors.

The wheel speed sensor 82 is configured to generate one pulse every time a corresponding wheel rotates by a fixed angle. The 4WD ECU 60 is configured to count the number of pulses generated by the wheel speed sensor 82 per unit time to calculate, based on the acquired count value, a speed of the wheel to which the wheel speed sensor 82 is provided (i.e., wheel speed of the wheel). More specifically, the wheel speed Vw is calculated based on equation (1) given below. In equation (1), r represents a dynamic radius of a rotating wheel, 107 represents an angular velocity of the wheel, N represents the number of teeth of a rotor (number of pulses to be generated per rotation of the rotor), and Ni represents the number of pulses that have been counted per unit time (measurement time) $\Delta T$.

$$Vw = r \cdot \omega = r \cdot (2 \cdot \pi / N) \cdot (Ni / \Delta T) \qquad (1)$$

The 4WD ECU 60 is configured to acquire a wheel speed Vwfl of the front left wheel WFL, a wheel speed Vwfr of the front right wheel WFR, a wheel speed Vwrl of the rear left wheel WRL, and a wheel speed Vwrr of the rear right wheel WRR in this manner.

The torque sensors 83FL, 83FR, 83RL, and 83RR are configured to generate output signals indicating driving torques Tfl, Tfr, Trl, and Trr acting on the front left wheel axle 32L, the front right wheel axle 32R, the rear left wheel axle 38L, and the rear right wheel axle 38R, respectively.

The 4WD ECU 60 is further electrically connected to the rear-wheel final gear device 35. The 4WD ECU 60 is configured to control coupling torques of the first clutch 361 and the second clutch 362 based on, for example, the accelerator opening degree AP and the wheel speeds Vwfl, Vwfr, Vwrl, and Vwrr.

The brake ECU 70 is electrically connected to a steering angle sensor 84, a yaw rate sensor 85, a lateral acceleration sensor 86, a master cylinder pressure sensor 87, and other sensors, and is configured to receive output signals from those sensors. The steering angle sensor 84 is configured to generate an output signal indicating a steering angle St of a steering wheel 84a provided so as to be operable by the driver. The yaw rate sensor 85 is configured to generate an output signal indicating a yaw rate Yr of the vehicle 10. The lateral acceleration sensor 86 is configured to generate an output signal indicating a lateral acceleration Gy of the vehicle 10. The master cylinder pressure sensor 87 is configured to generate an output signal indicating a master cylinder pressure Pm. The steering angle sensor 84, the yaw rate sensor 85, and the lateral acceleration sensor 86 are configured to detect the steering angle St, the yaw rate Yr, and the lateral acceleration Gy, respectively, with a left turning direction of the vehicle 10 being set as a positive direction.

The brake ECU 70 further calculates, based on the master cylinder pressure Pm, target braking forces Fbflt, Fbfrt, Fbrlt, and Fbrrt of the front left wheel WFL, the front right wheel WFR, the rear left wheel WRL, and the rear right wheel WRR, respectively. The brake ECU 70 controls braking pressures of the wheel cylinders 44FL, 44FR, 44RL, and 44RR corresponding to the respective wheels so that the braking forces of the respective wheels reach the corresponding target braking forces.

(Operation)

Hereinafter, an operation of the first device is described. The first device calculates an estimated vehicle body speed (i.e., the first device estimates a vehicle body speed). The estimated vehicle body speed is a parameter to be used to calculate slip ratios (acceleration slip ratio and braking slip ratio) required for execution of traction control and anti-skid control, for example. When an estimated vehicle body speed is represented by Vx, a wheel speed of each wheel is represented by Vwi (i represents fl, fr, ri, or rr), an acceleration slip ratio of each wheel is represented by SLai, and a braking slip ratio of each wheel is represented by SLbi, the acceleration slip ratio SLai is calculated based on equation (2) given below, and the braking slip ratio SLbi is calculated based on equation (3) given below.

$$SLai = (Vwi - Vx)/Vx \cdot 100 \qquad (2)$$

$$SLbi = (Vx - Vwi)/Vx \cdot 100 \qquad (3)$$

In the traction control, the first device individually applies a braking force to a wheel having a large acceleration slip ratio SLai to adjust the acceleration slip ratio SLai of each wheel to a predetermined slip ratio. In the anti-skid control, the first device individually reduces a braking force of a wheel having a large braking slip ratio SLbi to adjust the braking slip ratio SLbi of each wheel to a predetermined slip ratio.

Next, a method of calculating an estimated vehicle body speed Vx(n) (n is an integer) when the vehicle 10 is in a four-wheel drive state and is accelerating will be described. The estimated vehicle body speed Vx(n) is calculated based on equation (4) given below.

$$Vx(n) = \mathrm{MIN}(Vx(n-1) + \alpha \cdot \Delta T, Vwsel) \qquad (4)$$

In equation (4), Vx(n−1) represents a previously calculated value of the estimated vehicle body speed Vx(n) (estimated vehicle body speed that was calculated one calculation cycle before), Vwsel represents a selected wheel speed, $\alpha$ represents an acceleration upper limit value for the estimated vehicle body speed, $\Delta T$ represents a calculation cycle, and MIN represents a function of selecting a minimum value. The selected wheel speed Vwsel is calculated based on equation (5) given below. That is, the selected wheel speed Vwsel is the lowest wheel speed among the wheel speeds Vw of the four wheels.

$$Vwsel = \mathrm{MIN}(Vwfl, Vwfr, Vwrl, Vwrr) \qquad (5)$$

With equation (4), as the estimated vehicle body speed Vx(n), a smaller one of a "value obtained by adding, to the estimated vehicle body speed Vx(n−1) calculated at a calculation timing Tn−1 one calculation cycle before, a product of the acceleration upper limit value $\alpha$ and the calculation cycle $\Delta T$" (hereinafter also referred to as "upper limit guard value") and the "selected wheel speed Vwsel" is selected.

The procedure of calculating the estimated vehicle body speed Vx when the vehicle 10 is in a four-wheel drive state and is accelerating has been described above. The acceleration upper limit value α is set in advance based on the maximum acceleration of the wheel speed that can be generated on a high-μ road (dry asphalt road).

The first device calculates a road surface friction coefficient μ in the following manner in order to use the road surface friction coefficient μ to determine whether a road surface on which the vehicle 10 is traveling is a low-μ road. First, the first device acquires the driving torques Tfl, Tfr, Trl, and Trr detected by the torque sensors 83FL, 83FR, 83RL, and 83RR, respectively. Those driving torques are hereinafter also represented by "Ti" (i is fl, fr, rl, or rr).

Next, the first device calculates, based on the acquired driving torques Ti, a road surface friction coefficient μfl for the front left wheel WFL, a road surface friction coefficient μfr for the front right wheel WFR, a road surface friction coefficient μrl for the rear left wheel WRL, and a road surface friction coefficient μrr for the rear right wheel WRR. Those road surface friction coefficients are hereinafter also represented by as "μi" (i is fl, fr, rl, or rr). The road surface friction coefficient μi is calculated based on equation (6) given below.

$$\mu i = (Ti - I \cdot d\omega i)/r \cdot Mi \quad (6)$$

In equation (6), I represents inertia of each wheel, dωi (i is fl, fr, rl, or rr) represents an angular acceleration of each wheel, and Mi (i is fl, fr, rl, or rr) represents a load on each wheel.

When at least one of the road surface friction coefficients μi for the respective wheels WFL, WFR, WRL, and WRR is equal to or less than a threshold road surface friction coefficient μth defined in advance, the first device determines that the vehicle 10 is traveling on a low-μ road. When it is determined that the vehicle 10 is traveling on a low-μ road, the first device selects the smallest road surface friction coefficient among the road surface friction coefficients μi for the four wheels. The selected road surface friction coefficient is hereinafter referred to as "selected road surface friction coefficient μsel".

Incidentally, in a case where the vehicle 10 accelerates in a four-wheel drive state, when the road surface friction coefficient μ of a road surface on which the vehicle 10 is traveling is small, all the four wheels sometimes fall into a slip state. In this case, with equation (4) given above, the upper limit guard value "Vx(n−1)+α·ΔT" is selected as the estimated vehicle body speed Vx(n). However, the acceleration upper limit value α is not always an appropriate value, and hence the estimated vehicle body speed Vx(n) may deviate greatly from a true vehicle body speed.

In view of this, in such a case, as described below with reference to FIG. 2, the first device calculates the estimated vehicle body speed Vx while controlling the first clutch 361 and the second clutch 362.

Figure 2:
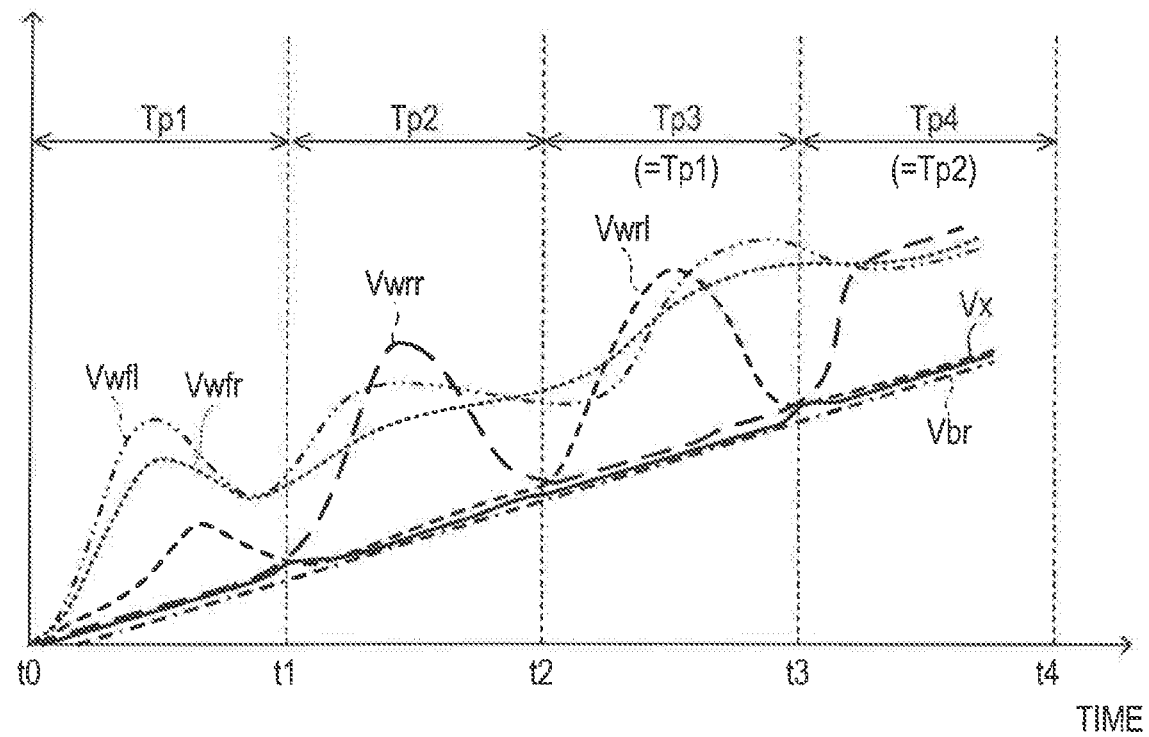
FIG. 2 is a graph for showing changes with time of a vehicle body speed and wheel speeds exhibits when a vehicle illustrated in FIG. 1 is traveling straight on a low-μ road while accelerating.

In FIG. 2, an example of changes with time of the estimated vehicle body speed Vx, the actual vehicle body speed Vbr, and the wheel speeds Vw of the respective wheels exhibited since the vehicle 10 has started accelerating on a low-μ road is shown. In this example, the vehicle 10 is first in a stopped state, and then starts accelerating at a time t0. In FIG. 2, the actual vehicle body speed (true vehicle body speed) Vbr indicated by the one-point two-dot chain line increases as the time elapses. In this example, the vehicle 10 is traveling straight at any time.

More specifically, during a period from the time t0 to a time t1 (hereinafter also referred to as "first period Tp1"), the first device sets the first clutch 361 to a restraint state and sets the second clutch 362 to a non-restraint state. The "restraint state" is, strictly speaking, a state in which the coupling torque of the first clutch 361 or the second clutch 362 is set to a value larger than zero, that is, a state in which the driving force transmitted to the rear left wheel axle 38L or the rear right wheel axle 38R is larger than zero. In this example, the restraint state is a state in which the coupling torque is set to the maximum value or a value close to the maximum value. Meanwhile, the "non-restraint state" is a state in which the coupling torque of the first clutch 361 or the second clutch 362 is set to zero, that is, a state in which the driving force transmitted to the rear left wheel axle 38L or the rear right wheel axle 38R is zero. "Setting a clutch to the non-restraint state" is also hereinafter expressed as "releasing" the clutch. The "coupling torque" means a transmission torque of each of the first clutch 361 and the second clutch 362, which form the coupling devices.

In the first period Tp1, the first clutch 361 is set to the restraint state, and the second clutch 362 is set to the non-restraint state, and hence three wheels of the front left wheel WFL, the front right wheel WFR, and the rear left wheel WRL drive the vehicle 10 as the drive wheels. The vehicle 10 is traveling on the low-μ road, and hence the three drive wheels are more liable to slip. Accordingly, increase rates of the wheel speed Vwfl of the front left wheel WFL, the wheel speed Vwfr of the front right wheel WFR, and the wheel speed Vwrl of the rear left wheel WRL are larger than an increase rate of the actual vehicle body speed Vbr.

In contrast, the rear right wheel WRR is set to the non-restraint state during the first period Tp1, and consequently, the rear right wheel WRR serving not as the drive wheel but as the free wheel (driven wheel) rotates without slipping while following the speed (actual vehicle body speed Vbr) of the vehicle 10. Accordingly, the wheel speed Vwrr of the rear right wheel WRR increases while following the increase in the actual vehicle body speed Vbr.

Subsequently, during a second period (period from the time t1 to a time t2) Tp2, which starts after the elapse of the first period Tp1, the first device sets the first clutch 361 to the non-restraint state and sets the second clutch 362 to the restraint state. Accordingly, the rear right wheel WRR serving as the drive wheel during the second period Tp2 is more liable to slip, and hence the wheel speed Vwrr of the rear right wheel WRR is higher than the actual vehicle body speed Vbr. Meanwhile, the rear left wheel WRL serving not as the drive wheel but as the free wheel rotates without slipping while following the actual vehicle body speed Vbr during the second period Tp2. Accordingly, the wheel speed Vwrl of the rear left wheel WRL increases while following the increase in the actual vehicle body speed Vbr.

During a third period (period from the time t2 to a time t3) Tp3, which starts after the elapse of the second period Tp2, in the same manner as in the first period Tp1, the first device sets the first clutch 361 to the restraint state and sets the second clutch 362 to the non-restraint state. Accordingly, the wheel speed Vwrr of the rear right wheel WRR increases while following the increase in the actual vehicle body speed Vbr.

During a fourth period (period from the time t3 to a time t4) Tp4, which starts after the elapse of the third period Tp3, in the same manner as in the second period Tp2, the first device sets the first clutch 361 to the non-restraint state and sets the second clutch 362 to the restraint state. Accordingly, the wheel speed Vwrl of the rear left wheel WRL increases while following the increase in the actual vehicle body speed Vbr.

For the sake of convenience, control of setting any one of the first clutch 361 and the second clutch 362 to the restraint state and setting another one thereof to the non-restraint state in this manner is referred to as "specific control".

Further, the first device acquires, when executing the specific control, the wheel speed of a "wheel corresponding to the clutch set to the non-restraint state (i.e., wheel serving as the free wheel)" of the first clutch 361 and the second clutch 362 as the estimated vehicle body speed.

Specifically, the first device selects, as the estimated vehicle body speed Vx, the wheel speed Vwrr of the rear right wheel WRR during the first period Tp1, selects the wheel speed Vwrl of the rear left wheel WRL during the second period Tp2, selects the wheel speed Vwrr of the rear right wheel WRR during the third period Tp3, and selects the wheel speed Vwrl of the rear left wheel WRL during the fourth period Tp4 (see solid line Vx of FIG. 2). As a result, the first device can acquire the estimated vehicle body speed Vx (solid line) that is close to the actual vehicle body speed Vbr (one-point two-dot chain line). In this case, the first device sets each of the first period Tp1 to the fourth period Tp4 to one second.

As can be understood from the above description, the first device maintains a first state, in which the coupling torque Tc1 of the first clutch 361 (hereinafter also referred to as "first coupling torque Tc1") is set to a value larger than zero and the coupling torque Tc2 of the second clutch 362 (hereinafter also referred to as "second coupling torque Tc2") is set to zero, for the first predetermined period Tp1. Subsequently, the first device maintains a second state, in which the first coupling torque Tc1 is set to zero and the second coupling torque Tc2 is set to a value larger than zero, for the second predetermined period Tp2. For the sake of convenience, this series of steps of control is referred to as "first control". The first control is a part of the above-mentioned specific control. Further, the first device is configured to repeatedly perform the first control.

(Specific Operation)
<Estimation of Accelerating Vehicle Body Speed>

Hereinafter, actual operations of the first device will be described. The CPU of the 4WD ECU 60 (hereinafter referred to simply as "CPU") is configured to execute, when an execution condition satisfied when conditions (A) to (C) given below are all satisfied is satisfied, an accelerating vehicle body speed estimation routine illustrated by a flowchart of FIG. 3 every time a constant time elapses. A first counter C1 and a second counter C2 are set to "0" when an ignition key switch (not shown) is switched from OFF to ON.

[Execution Condition]
(A) The vehicle 10 is accelerating. In other words, the accelerator opening degree AP is larger than "0".
(B) The vehicle 10 is traveling on a low-µ road. In other words, at least one of the road surface friction coefficients µi is equal or smaller than the threshold road surface friction coefficient µth defined in advance.
(C) A four-wheel drive mode is selected with use of a mode selection switch (not shown) (drive mode with only front wheels is not selected).

In the following, assuming that the vehicle 10 is in the state illustrated in FIG. 2, the descriptions are made according to each of cases.

(1) When Current Time (Time t) is at Time t0

The CPU starts the process from Step 300 at a certain time point to proceed to Step 305 at which the CPU determines whether the vehicle 10 is traveling straight. Whether the vehicle 10 is traveling straight is determined based on whether a magnitude Yrabs of a detection signal acquired by the yaw rate sensor 85 (magnitude of yaw rate Yr) is equal to or smaller than a predetermined threshold yaw rate Yrth. The CPU may determine that the vehicle 10 is traveling straight when a magnitude Stabs of the steering angle St detected by the steering angle sensor 84 is equal to or smaller than a predetermined first steering angle Stth1.

At the time t0, the vehicle speed of the vehicle 10 is "0". That is, at the time t0, the yaw rate Yr is not generated, and is equal to or smaller than the predetermined threshold yaw rate Yrth. Accordingly, the CPU makes "Yes" determination at Step 305 to proceed to Step 310 at which the CPU determines whether a value of the first counter C1 is equal to or larger than a maximum value Cmax. The maximum value Cmax is set to a predetermined value, which is larger than "2". At the time t0, the value of the first counter C1 is "0", and is not equal to or larger than the maximum value Cmax. Accordingly, the CPU makes "No" determination at Step 310 to proceed to Step 320 at which the CPU increments the value of the first counter C1 by "1".

Subsequently, the CPU proceeds to Step 325 to determine whether a value of the second counter C2 is an even number. At the present time point, the value of the second counter C2 is "0". Accordingly, the CPU makes "Yes" determination at Step 325 to proceed to Step 330 at which the CPU sets a value of a first clutch release request flag XCR1 to "0" and a value of a second clutch release request flag XCR2 to "1". The first clutch release request flag XCR1 and the second clutch release request flag XCR2 are hereinafter also referred to as "first flag XCR1" and "second flag XCR2", respectively.

Subsequently, the CPU proceeds to Step 340 to acquire (set) the first coupling torque Tc1 and the second coupling torque Tc2 based on the values of the first flag XCR1 and the second flag XCR2 set at Step 330, and on a result of a coupling torque setting routine (not shown) to be executed separately. In the coupling torque setting routine, the CPU is configured to set the values of the first coupling torque Tc1 and the second coupling torque Tc2 based on the first flag XCR1, the second flag XCR2, the accelerator opening degree AP, the yaw rate Yr, and the steering angle St, for example.

For example, the CPU executes the coupling torque setting routine, to thereby determine the values of the first coupling torque Tc1 and the second coupling torque Tc2 in the following manner. Specifically, when the values of the first flag XCR1 and the second flag XCR2 are set to "0", the CPU sets the magnitudes of the first coupling torque Tc1 and the second coupling torque Tc2 to be larger as the magnitude of the accelerator opening degree AP becomes larger. In this case, for example, when the magnitude Yrabs of the yaw rate Yr is extremely small, the first coupling torque Tc1 and the second coupling torque Tc2 are set to the same value.

Further, as the yaw rate Yr becomes smaller (increases in the negative direction), the CPU sets the value of the first coupling torque Tc1 to be larger, and sets the value of the second coupling torque Tc2 to be smaller. In contrast, as the yaw rate Yr becomes larger (increases in the positive direction), the CPU sets the value of the first coupling torque Tc1 to be smaller, and sets the value of the second coupling torque Tc2 to be larger. Meanwhile, when the value of the first flag XCR1 is set to "1", the CPU sets the first coupling torque Tc1 to "0", and when the value of the second flag XCR2 is set to "1", the CPU sets the second coupling torque Tc2 to "0".

At the present time point, the value of the first flag XCR1 is set to "0", and the value of the second flag XCR2 is set to "1". Accordingly, the CPU sets the first coupling torque Tc1 to a value larger than "0" (in this example, a value for setting the first clutch 361 to the restraint state, for example, the maximum value of the first coupling torque Tc1) and sets the second coupling torque Tc2 to "0". At Step 340, the CPU acquires those values. Subsequently, the CPU proceeds to Step 345 to control the first clutch 361 and the second clutch 362 based on the set first coupling torque Tc1 and second coupling torque Tc2, respectively.

Subsequently, the CPU proceeds to Step 350 to determine whether the value of the second flag XCR2 is "1". At the present time point, the value of the second flag XCR2 is "1". Accordingly, the CPU makes "Yes" determination at Step 350 to proceed to Step 355 at which the CPU sets the estimated vehicle body speed Vx to the wheel speed Vwrr of the rear right wheel WRR. That is, the CPU estimates the wheel speed Vwrr as the vehicle body speed of the vehicle 10. Subsequently, the CPU proceeds to Step 395 to tentatively terminate the present routine.

(2) When t0<t<t1

The vehicle 10 is traveling straight as described above, and hence the CPU makes "Yes" determination at Step 305 to proceed to Step 310. At the present time point, the value of the first counter C1 is "1", and hence the CPU makes "No" determination at Step 310 to proceed to Step 320 at which the CPU increments the first counter C1 by "1", and then proceeds to Step 325. Subsequently, the CPU makes "Yes" determination at Step 325 to proceed to Step 330 at which the CPU sets the value of the first flag XCR1 to "0" and sets the value of the second flag XCR2 to "1".

Subsequently, at Step 340, the CPU acquires (sets) the first coupling torque Tc1 and the second coupling torque Tc2. In this case, the CPU sets the first coupling torque Tc1 to a value larger than "0" and sets the second coupling torque Tc2 to "0". Subsequently, the CPU proceeds to Step 345 to control the first clutch 361 and the second clutch 362 based on the set first coupling torque Tc1 and second coupling torque Tc2, respectively.

Subsequently, the CPU proceeds to Step 350. The CPU makes "Yes" determination at Step 350 to proceed to Step 355 at which the CPU sets the estimated vehicle body speed Vx to the wheel speed Vwrr of the rear right wheel WRR. In this routine, the second coupling torque Tc2 is set to "0", and the rear right wheel WRR is in the non-restraint state (serves as the free wheel), and hence the wheel speed Vwrr of the rear right wheel WRR is lower than the wheel speeds of the other wheels serving as the drive wheels, and is closest to the actual vehicle body speed Vbr among the wheel speeds Vw of the four wheels. Accordingly, the CPU sets the estimated vehicle body speed Vx to the wheel speed Vwrr of the rear right wheel WRR in the above-mentioned manner.

(3) When Time t Reaches Time t1

Figure 4:
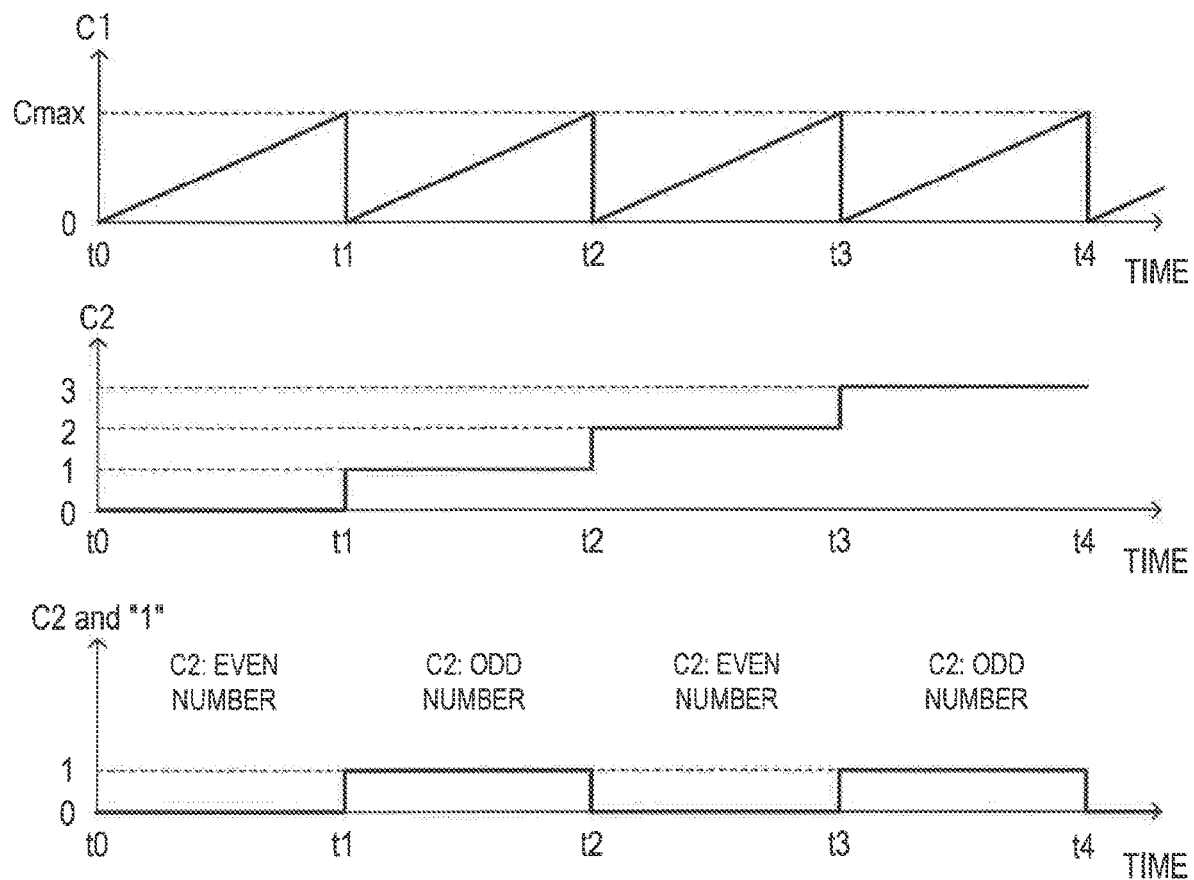
FIG. 4 is a graph for showing counter values of the control device each corresponding to the changes with time of the vehicle body speed and the wheel speeds shown in FIG. 2.

When the above-mentioned state is maintained, the value of the first counter C1 gradually increases, and, as shown in FIG. 4, reaches the maximum value Cmax at the time t1. Accordingly, when the CPU proceeds to Step 310, the CPU makes "Yes" determination at Step 310. Then, the CPU proceeds to Step 315 to increment the value of the second counter C2 by "1" and set the value of the first counter C1 to "0" (i.e., reset the first counter C1), and proceeds to Step 325. As a result, the value of the second counter C2 reaches "1", which is an odd number. This result is shown in FIG. 4 as a logical product of the value of the second counter C2 and "1" being "1".

Accordingly, the CPU makes "No" determination at Step 325 to proceed to Step 335 at which the CPU sets the value of the first flag XCR1 to "1" and sets the value of the second flag XCR2 to "0". Subsequently, the CPU proceeds to Step 340 to acquire (set) the first coupling torque Tc1 and the second coupling torque Tc2. The CPU sets the first coupling torque Tc1 to "0" and sets the second coupling torque Tc2 to a value larger than "0" (in this example, the value is the maximum value that brings the second clutch 362 into the restraint state).

Subsequently, at Step 345, the CPU controls the first clutch 361 and the second clutch 362 based on the first coupling torque Tc1 and the second coupling torque Tc2, and proceeds to Step 350. As a result, the rear left wheel WRL is brought into the non-restraint state, and the rear right wheel WRR is brought into the restraint state. At Step 335, the second flag XCR2 is set to "0". Accordingly, the CPU makes "No" determination at Step 350 to proceed to Step 360 at which the CPU determines whether the value of the first flag XCR1 is "1". At Step 335, the value of the first flag XCR1 is set to "1". Accordingly, the CPU makes "Yes" determination at Step 360 to proceed to Step 365 at which the CPU sets the estimated vehicle body speed Vx to the wheel speed Vwrl of the rear left wheel WRL. That is, the CPU estimates the wheel speed Vwrl as the vehicle body speed of the vehicle 10.

After that, the CPU proceeds to Step 395 to tentatively terminate the present routine. In this routine, the first coupling torque Tc1 is set to "0", and the rear left wheel WRL is in the non-restraint state (serves as the free wheel), and hence the wheel speed Vwrl of the rear left wheel WRL is lower than the wheel speeds of the other wheels serving as the drive wheels, and is closest to the actual vehicle body speed Vbr among the wheel speeds Vw of the four wheels. Accordingly, the CPU sets the estimated vehicle body speed Vx to the wheel speed Vwrl of the rear left wheel WRR in the above-mentioned manner.

(4) When t1<t<t2

When the above-mentioned state is maintained, the value of the first counter C1 gradually increases, but, as shown in FIG. 4, does not reach the maximum value Cmax. Accordingly, when the CPU proceeds to Step 310, the CPU makes "No" determination at Step 310 to proceed to Step 325 via Step 320. Then, the CPU makes "No" determination at Step 325 to proceed to Step 335.

Subsequently, the CPU executes the processes of Step 340 and Step 345. As a result, the rear left wheel WRL is maintained in the non-restraint state, and the rear right wheel WRR is maintained in the restraint state. Subsequently, the CPU makes "No" determination at Step 350 and makes "Yes" determination at Step 360 to proceed to Step 365. Accordingly, the CPU sets the estimated vehicle body speed Vx to the wheel speed Vwrl of the rear left wheel WRL.

(5) When Time t Reaches Time t2

When the above-mentioned state is maintained, the value of the first counter C1 gradually increases, and, as shown in FIG. 4, reaches the maximum value Cmax again at the time t2. Accordingly, the CPU makes "Yes" determination at Step 310 to proceed to Step 315 at which the CPU increments the value of the second counter C2 by "1". As a result, the value of the second counter C2 reaches "2", which is an even number. This result is shown in FIG. 4 as a logical product of the value of the second counter C2 and "1" being "0".

Further, the first counter C1 is set (cleared) to "0". As a result, the CPU makes "Yes" determination at Step 325 to proceed to Step 330 again. Accordingly, the value of the second flag XCR2 is set to "1", and hence at Step 340 and Step 345, the first coupling torque Tc1 is set to a value larger than "0", and the second coupling torque Tc2 is set to "0".

Further, the CPU proceeds from Step 350 to Step 355. As a result, in the same manner as in the period from the time t0 to the time t1, the CPU estimates the wheel speed Vwrr as the vehicle body speed of the vehicle 10. As can be understood from the above description, after the time t2, control having the operation from the time t0 to the time t1 and the operation from the time t1 to the time t2 as one set is repeatedly performed.

When the vehicle 10 is not traveling straight, the CPU makes "No" determination at Step 305 to proceed to Step 375 at which the CPU sets each of the value of the first flag XCR1 and the value of the second flag XCR2 to "0". Further, at Step 375, the CPU sets each of the value of the first counter C1 and the value of the second counter C2 to "0". Subsequently, the CPU proceeds to Step 340 to acquire the first coupling torque Tc1 and the second coupling torque Tc2 that have been calculated in the above-mentioned coupling torque setting routine. In this case, neither the value of the first flag XCR1 nor the value of the second flag XCR2 is set to "1", and hence both of the first coupling torque Tc1 and the second coupling torque Tc2 are set to a value larger than "0".

Next, the CPU proceeds to Step 345 to control the first clutch 361 and the second clutch 362 based on the first coupling torque Tc1 and the second coupling torque Tc2. Subsequently, the CPU makes "No" determination at each of Step 350 and Step 360 to proceed to Step 368 at which the CPU calculates the selected wheel speed Vwsel based on equation (5). Subsequently, the CPU proceeds to Step 370 to calculate the estimated vehicle body speed Vx based on equation (4), and proceeds to Step 395 to tentatively terminate the present routine.

As described above, the first device is to be applied to the four-wheel drive vehicle 10 including the first clutch (first coupling device) 361 interposed between the drive output device 353 of the rear-wheel final gear device 35 and the rear left wheel axle 38L and the second clutch (second coupling device) 362 interposed between the drive output device 353 and the rear right wheel axle 38R.

The first device includes: the wheel speed sensors 82 each configured to generate a signal based on the rotation speed of a corresponding one of the wheels coupled to the front left wheel axle 32L, the front right wheel axle 32R, the rear left wheel axle 38L, and the rear right wheel axle 38R, respectively; the wheel speed calculator 60 configured to calculate the wheel speed Vw of each of the wheels based on the signals generated by the wheel speed sensors 82; the estimated vehicle body speed calculator 60 configured to estimate the vehicle body speed of the vehicle 10 based on the specific wheel speed Vwsel among the calculated wheel speeds Vw; and the controller 60 configured to change the coupling torque Tc1 of the first clutch 361 and the coupling torque Tc2 of the second clutch 362 independently of each other.

The controller 60 is configured to execute, when the vehicle 10 is accelerating, the specific control of "setting the coupling torque of any one of the first clutch 361 and the second clutch 362 to a value larger than zero and setting the coupling torque of another one thereof to zero". The estimated vehicle body speed calculator 60 is configured to use, as the "specific wheel speed for calculating the estimated vehicle body speed", the wheel speed Vw of one of the wheels that corresponds to one of the first clutch 361 and the second clutch 362 that has the coupling torque set to zero.

With this configuration, when the vehicle 10 is accelerating, the driving force is applied to any one of the rear left wheel WRL and the rear right wheel WRR, and the driving force is not applied to another one thereof. Accordingly, any one of the wheel speed Vwrl of the rear left wheel WRL and the wheel speed Vwrr of the rear right wheel WRR is always extremely close to the actual vehicle body speed Vbr. The first device is therefore capable of accurately estimating the vehicle body speed even when the vehicle is traveling on a low-μ road while accelerating.

Further, the first device is configured to repeatedly perform, as the specific control, the first control of maintaining the first state, in which the coupling torque Tc1 of the first clutch 361 is set to a value larger than zero and the coupling torque Tc2 of the second clutch 362 is set to zero, for the first predetermined period (Tp1, Tp3), and subsequently maintaining the second state, in which the coupling torque Tc1 of the first clutch 361 is set to zero and the coupling torque Tc2 of the second clutch 362 is set to a value larger than zero, for the second predetermined period (Tp2, Tp4).

With this configuration, every time a predetermined period of time (first predetermined period or second predetermined period) elapses, the driving torque is alternately applied to the rear left wheel and the rear right wheel. Accordingly, as compared with a case in which the driving torque is continuously applied to only one of the rear left wheel and the rear right wheel, it is possible to enhance stability of the vehicle while the vehicle is traveling straight. Moreover, as compared with a case in which the driving torque is not applied to any one of the rear left wheel and the rear right wheel, traveling performance of the vehicle can be enhanced.

Second Embodiment

Next, a control device for a four-wheel drive vehicle according to a second embodiment of the present invention (hereinafter referred to as "second device") will be described. The second device differs from the first device only in that, when a drive mode is a normal mode, the above-mentioned specific control is performed to estimate a vehicle body speed. Accordingly, this difference will be mainly described below.

The second device is capable of implementing any one of the "normal mode (first mode)" and an "active mode (second mode)" as a travel mode (drive mode) of the vehicle 10. The driver of the vehicle 10 can select any one of the normal mode and the active mode by operating an operation switch (not shown). The "normal mode" is a travel mode in which traveling stability of the vehicle 10 is prioritized over traveling performance (acceleration performance) thereof. The "active mode" is a travel mode in which the traveling performance of the vehicle 10 is prioritized over the traveling stability thereof.

When the normal mode is selected, the second device sets the driving force of the drive device 20 corresponding to the accelerator opening degree AP to a normal force. This setting prevents the vehicle 10 from rapidly accelerating and rapidly decelerating. As a result, when the normal mode is selected, the vehicle 10 can travel more stably. In contrast, when the active mode is selected, the second device sets the driving force of the drive device 20 corresponding to the accelerator opening degree AP to be larger than when the normal mode is selected. As a result, when the active mode is selected, as compared with the case in which the normal mode is selected, the traveling performance of the vehicle 10 is improved.

Next, an operation of the second device to be performed when the second device estimates the vehicle body speed will be described. A CPU of the 4WD ECU 60 of the second device is configured to execute, when the above-mentioned execution condition is satisfied, an accelerating vehicle body speed estimation routine illustrated by a flowchart of FIG. 5 every time a constant time elapses.

Figure 3:
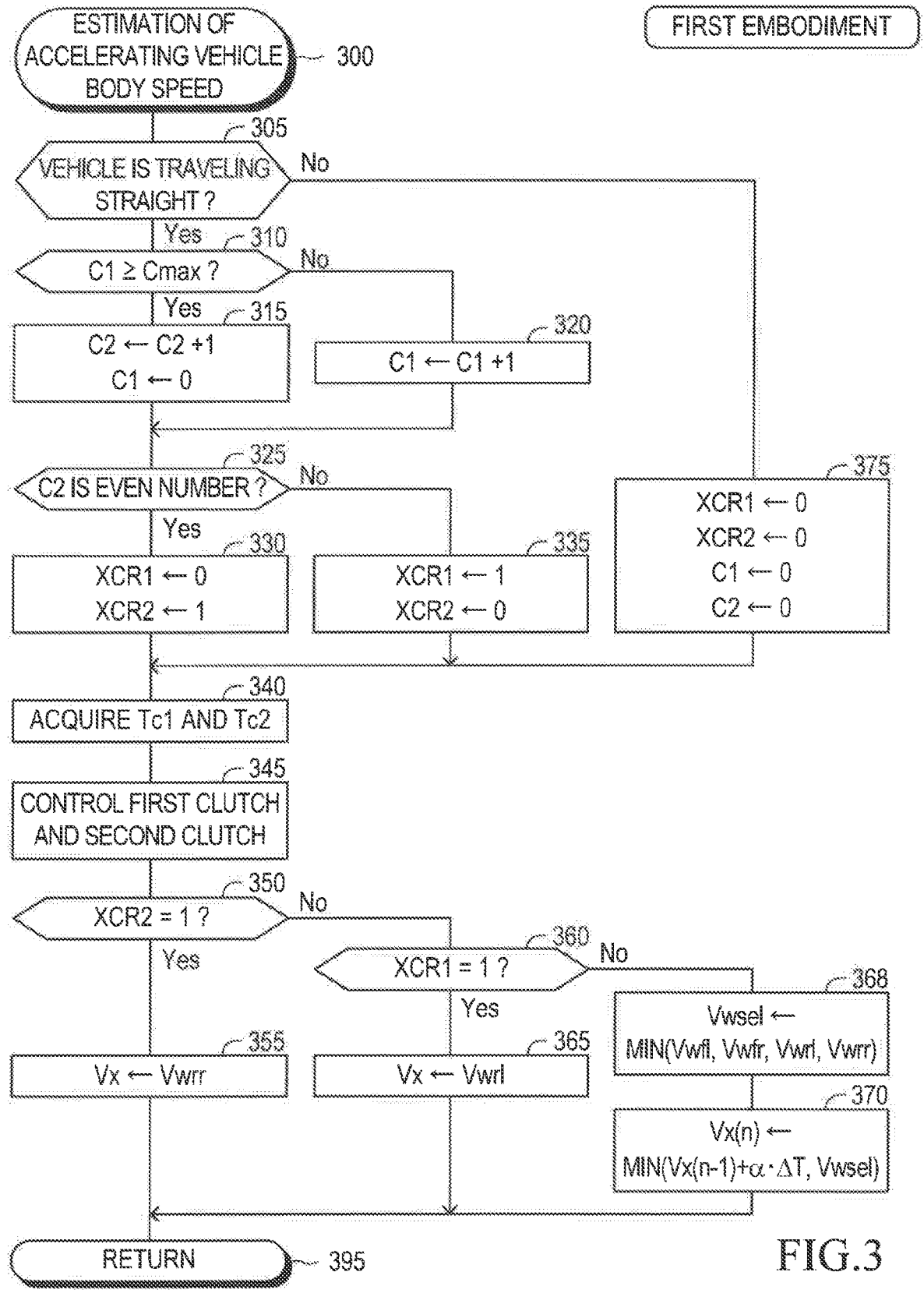
FIG. 3 is a flowchart for illustrating an "accelerating vehicle body speed estimation routine" to be executed by a CPU of a 4WD ECU illustrated in FIG. 1.

When the execution condition is satisfied, the CPU starts the process from Step 500 a certain time point to proceed to Step 510 at which the CPU determines whether the driver has selected the "normal mode". When the driver has selected the "normal mode", the CPU makes "Yes" determination at Step 510 to proceed to Step 305. Step 305 to Step 375 to be executed subsequently are steps in which the same processing steps as those of Step 305 to Step 375 illustrated in FIG. 3 are to be executed, respectively, and hence a description thereof is omitted.

Meanwhile, when the driver has not selected the "normal mode" (i.e., has selected the "active mode"), the CPU makes "No" determination at Step 510 to proceed to Step 520 at which the CPU sets each of the value of the first flag XCR1 and the value of the second flag XCR2 to "0".

Next, the CPU proceeds to Step 340 and Step 345. In this case, both of the value of the first flag XCR1 and the value of the second flag XCR2 are set to "0". That is, neither the value of the first flag XCR1 nor the value of the second flag XCR2 is set to "1". Accordingly, through the above-mentioned coupling torque setting routine, both of the first coupling torque Tc1 and the second coupling torque Tc2 are set to a value larger than "0".

After that, the CPU makes "No" determination at both of Step 350 and Step 360. Then, the CPU proceeds to Step 368 and Step 370 to calculate the estimated vehicle body speed Vx based on equation (4) and equation (5), and proceeds to Step 595 to tentatively terminate the present routine.

As described above, when the driver has selected the "active mode", the second device sets each of the value of the first flag XCR1 and the value of the second flag XCR2 to "0". With this setting, the respective driving forces to be applied to the rear left wheel WRL and the rear right wheel WRR are determined based on the first coupling torque Tc1 and the second coupling torque Tc2 calculated in the coupling torque setting routine to be executed separately. In contrast, when the driver has selected the normal mode, and the vehicle 10 is accelerating and traveling straight, the specific control described in the first embodiment is executed. In this case, the wheel speed Vw of a wheel corresponding to one of the first clutch 361 and the second clutch 362 that has the coupling torque set to zero is used as the "specific wheel speed for calculating the estimated vehicle body speed".

Modification Example

The present invention is not limited to the embodiments described above. As described below, various modification examples can be employed within the scope of the present invention.

In the above-mentioned specific control, the length of the first period, during which the first clutch 361 is controlled to be in the restraint state and the second clutch 362 is controlled to be in the non-restraint state, is set to the same time period (1 second) as the length of the second period, during which the first clutch 361 is controlled to be in the non-restraint state and the second clutch 362 is controlled to be in the restraint state. However, the length of the first period and the length of the second period may differ from each other. In other words, a period during which the driving force is to be applied to one of the left and rear right wheels and a period during which the driving force is to be applied to another one thereof may differ from each other.

In the embodiments described above, the first period may end when the vehicle 10 has traveled for a first predetermined distance, and the second period may end when the vehicle 10 has traveled for a second predetermined distance. In other words, the above-mentioned specific control may be executed by maintaining the first state, in which the coupling torque Tc1 of the first clutch 361 is set to a value larger than zero and the coupling torque Tc2 of the second clutch 362 is set to zero, for a period in which the vehicle 10 travels for a first distance Dp1, and subsequently maintaining the second state, in which the coupling torque of the first clutch 361 is set to zero and the coupling torque of the second clutch 362 is set to a value larger than zero, for a period in which the vehicle 10 travels for a second distance Dp2. For the sake of convenience, this series of steps of control is referred to as "second control". The second control is repeatedly executed. The travel distance of the vehicle 10 is calculated based on the number of pulses of the wheel speed sensor 82 of a wheel corresponding to the clutch that has the coupling torque set to zero.

Figure 5:
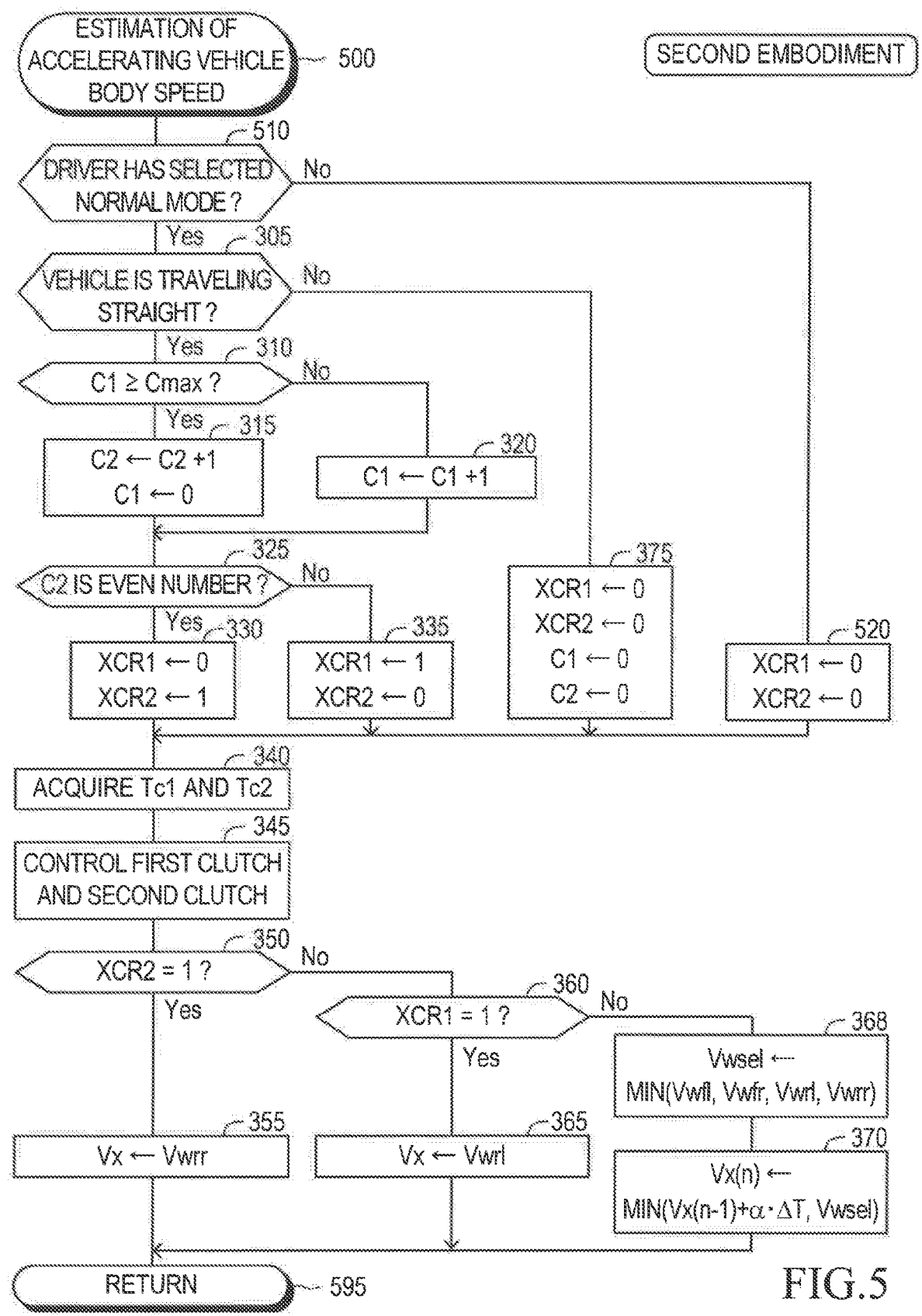
FIG. 5 is a flowchart for illustrating an "accelerating vehicle body speed estimation routine" to be executed by a CPU of a 4WD ECU of a control device according to a second embodiment of the present invention.

In this case, for example, the CPU replaces the first counter C1 used in FIG. 3 or FIG. 5 with a "third counter C3 for measuring a travel distance", and replaces the maximum value Cmax at Step 310 with a maximum value C3max. Further, the CPU increments the third counter C3 by "1" every time the wheel speed sensor 82 of a wheel corresponding to the clutch that has the coupling torque set to zero generates a pulse.

In the second embodiment described above, the driver selects the "normal mode" or the "active mode" by operating the operation switch. In place of this configuration, when an average value of the accelerator opening degree AP during a period in which the vehicle 10 travels for a predetermined distance or for a predetermined period of time exceeds a threshold accelerator opening degree, the CPU may automatically change the travel mode from the normal mode to the active mode. Meanwhile, when the average value of the accelerator opening degree AP during the period in which the vehicle 10 travels for the predetermined distance or for the predetermined period of time falls below the threshold accelerator opening degree, the CPU may automatically change the travel mode from the active mode to the normal mode.

Similarly, when the number of times that a parameter indicating a driving state, which is described below, exceeds a threshold change rate becomes equal to or larger than a threshold count during the period in which the vehicle 10 travels for the predetermined distance or for the predetermined period of time, the CPU may automatically change the travel mode from the normal mode to the active mode. Meanwhile, when the number of times that the parameter indicating the driving state exceeds the threshold change rate becomes smaller than the threshold count during the period in which the vehicle 10 travels for the predetermined distance or for the predetermined period of time, the CPU may automatically change the travel mode from the active mode to the normal mode.

The parameter indicating the driving state includes any one of, for example, an accelerator opening degree change rate (dAp/dt), a magnitude |dSt/dt| of a steering angle change rate, a magnitude of a longitudinal acceleration of the vehicle 10, and a magnitude of a lateral acceleration of the vehicle 10.

In the embodiments described above, the CPU of the 4WD ECU 60 executes the accelerating vehicle body speed estimation routines illustrated in FIG. 3 and FIG. 5. However, in place of the CPU of the 4WD ECU 60, a CPU of the brake ECU 70 may execute those routines, or a CPU of one ECU in which, for example, the 4WD ECU 60 and the brake ECU 70 are integrated may execute those routines.

At Step 305 of the embodiments described above, whether the vehicle is traveling straight is determined based on whether the magnitude Yrabs of the yaw rate is equal to or smaller than the predetermined threshold yaw rate Yrth, but may be determined based on whether a magnitude Gyabs of the lateral acceleration is equal to or smaller than a predetermined threshold lateral acceleration Gyth. As another example, whether the vehicle is traveling straight may be determined based on whether a magnitude Stabs of the steering angle is equal to or smaller than a predetermined second steering angle Stth2.

In the embodiments described above, the CPU may proceed directly from Step 345 to Step 368 and Step 370 without performing the determination at Step 350 and Step 360. As described above, when the second flag XCR2 is "1", the rear right wheel WRR serves as the free wheel, and the remaining wheels serve as the drive wheels. Accordingly, when the vehicle 10 is accelerating, the wheel speed Vwrr of the rear right wheel WRR serving as the free wheel is the lowest among the wheel speeds of the four wheels, and hence at Step 368 and Step 370, the wheel speed Vwrr of the rear right wheel WRR is selected. Similarly, when the first flag XCR1 is "1", the rear left wheel WRL serves as the free wheel, and the remaining wheels serve as the drive wheels. Accordingly, when the vehicle 10 is accelerating, the wheel speed Vwrl of the rear left wheel WRL serving as the free wheel is the lowest among the wheel speeds of the four wheels, and hence at Step 368 and Step 370, the wheel speed Vwrl of the rear left wheel WRL is selected.

In the embodiments described above, a clutch obtained by combining a multi-plate clutch and an electromagnetic clutch is used as the clutch device (coupling device) 36, but only a multi-plate clutch or only an electromagnetic clutch may be used. Further, a planetary gear mechanism may be used in the clutch device (coupling device) 36. In this case, for example, the drive output device 353 of the rear-wheel final gear device is coupled to a sun gear, and the rear left wheel axle 38L or the rear right wheel axle 38R is coupled to a planetary gear. In this case, by changing the restraint state of an outer gear of the planetary gear mechanism, the driving force to be transmitted to the rear left wheel axle 38L and the rear right wheel axle 38R can be controlled.

In the embodiments described above, the acceleration upper limit value α is set based on the maximum acceleration of the wheel speed that can be generated on a high-μ road, but may be acquired based on the road surface friction coefficient μ calculated by equation (6). More specifically, the first device selects the smallest road surface friction coefficient μ among the calculated road surface friction coefficients μ corresponding to the respective wheels. The first device may calculate the acceleration upper limit value α by applying the selected road surface friction coefficient μsel to a lookup table Mapα(μsel) defining a relationship between the selected road surface friction coefficient μsel and the acceleration upper limit value α. The acceleration upper limit value α is defined to become larger as the selected road surface friction coefficient μsel becomes larger.

What is claimed is:

1. A control device for a four-wheel drive vehicle, which is to be applied to a four-wheel drive vehicle, the four-wheel drive vehicle including:
    a drive device configured to generate a driving force;
    a front-wheel differential device configured to transmit the driving force to a front left wheel axle and a front right wheel axle and to allow a differential between the front left wheel axle and the front right wheel axle;
    a transfer gear device configured to transmit the driving force to a rear wheel side via a propeller shaft;
    a rear-wheel final gear device configured to transmit the driving force from the propeller shaft to a rear left wheel axle and a rear right wheel axle;
    a first coupling device interposed between a drive output device of the rear-wheel final gear device and the rear left wheel axle; and
    a second coupling device interposed between the drive output device and the rear right wheel axle,
  the control device comprising:
    wheel speed sensors each configured to generate a signal based on a rotation speed of a corresponding one of wheels coupled to the front left wheel axle, the front right wheel axle, the rear left wheel axle, and the rear right wheel axle, respectively;
    a wheel speed calculator configured to calculate a wheel speed of each of the wheels based on the signals generated by the wheel speed sensors;
    an estimated vehicle body speed calculator configured to estimate a vehicle body speed of the four-wheel drive vehicle based on a specific wheel speed among the calculated wheel speeds; and
    a controller configured to change a coupling torque of the first coupling device and a coupling torque of the second coupling device independently of each other,
  wherein the controller is configured to execute, when the four-wheel drive vehicle is accelerating, a specific control of setting the coupling torque of any one of the first coupling device and the second coupling device to a value larger than zero and setting the coupling torque of another one of the first coupling device and the second coupling device to zero, and
  wherein the estimated vehicle body speed calculator is configured to use, as the specific wheel speed, the wheel speed of one of the wheels that corresponds to one of the first coupling device and the second coupling device that has the coupling torque set to zero.

2. The control device for a four-wheel drive vehicle according to claim 1, wherein the controller is configured to repeatedly perform, as the specific control, a first control of maintaining a first state, in which the coupling torque of the first coupling device is set to a value larger than zero and the coupling torque of the second coupling device is set to zero, for a first predetermined period, and subsequently maintaining a second state, in which the coupling torque of the first coupling device is set to zero and the coupling torque of the second coupling device is set to a value larger than zero, for a second predetermined period.

3. The control device for a four-wheel drive vehicle according to claim 1, wherein the controller is configured to repeatedly perform, as the specific control, a second control of maintaining a first state, in which the coupling torque of the first coupling device is set to a value larger than zero and the coupling torque of the second coupling device is set to zero, for a period in which the four-wheel drive vehicle travels for a first distance, and subsequently maintaining a second state, in which the coupling torque of the first coupling device is set to zero and the coupling torque of the second coupling device is set to a value larger than zero, for a period in which the four-wheel drive vehicle travels for a second distance.

* * * * *